Oct. 6, 1925.

K. OBERMOSER 1,556,299

AUTOMATIC COUPLING

Filed June 8, 1922   2 Sheets-Sheet 1

Inventor:-
Karl Obermoser
by his attorney

Oct. 6, 1925.

K. OBERMOSER 1,556,299

AUTOMATIC COUPLING

Filed June 8, 1922  2 Sheets-Sheet 2

Inventor
Karl Obermoser
by [signature]
attorney

Patented Oct. 6, 1925.

1,556,299

UNITED STATES PATENT OFFICE.

KARL OBERMOSER, OF BADEN-BADEN, GERMANY.

AUTOMATIC COUPLING.

Application filed June 8, 1922. Serial No. 566,850.

*To all whom it may concern:*

Be it known that I, KARL OBERMOSER, a citizen of the German Republic, residing at Baden-Baden, in the county of Baden, Germany, have invented certain new and useful Improvements in Automatic Couplings, of which the following is a specification.

My invention has reference to improvements in automatic shaft couplings and relates more particularly to a coupling means which is positively operated in the one or the other sense, that is to say in coupling or uncoupling sense, without the requirement of any special auxiliary operating mechanism, merely by operative mass impulses or shocks sent into the system over the shafting. The invention specifically consists in the provision of a driving and a driven unit, interposed coupling means controlled by a force generated in the coupling, for instance centrifugal force, and locking means restrainingly cooperating with the centrifugally controlled coupling means, which locking means are actuated by sudden mass impulses, obtained for instance by intentionally momentarily retarding or accelerating the operative speed of either the driving or the driven units or both relative to the coupling means, whereby the latter are freed by the locking means to move into the respectively opposite end position, throwing thereby the driving and the driven clutch units into or out of intercoupling cooperation as the case may be.

Figure 2:
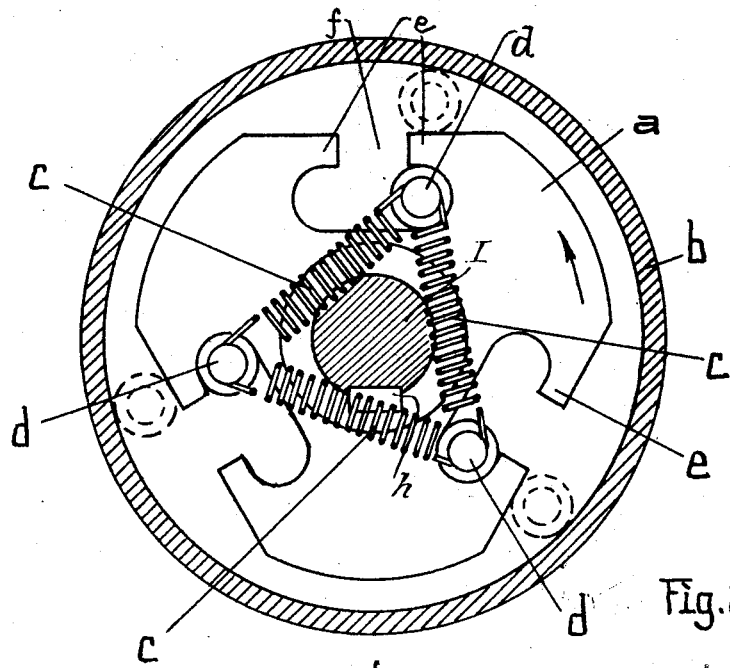
Figure 1:
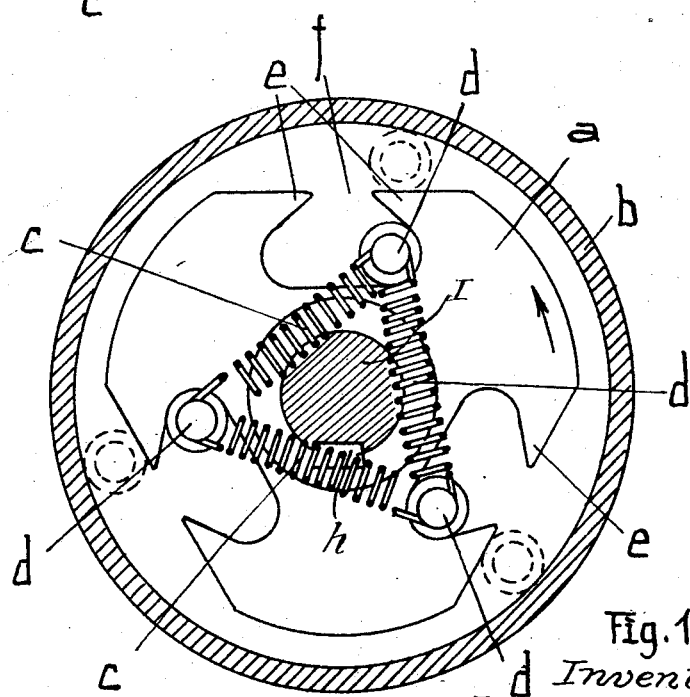
Figure 3:
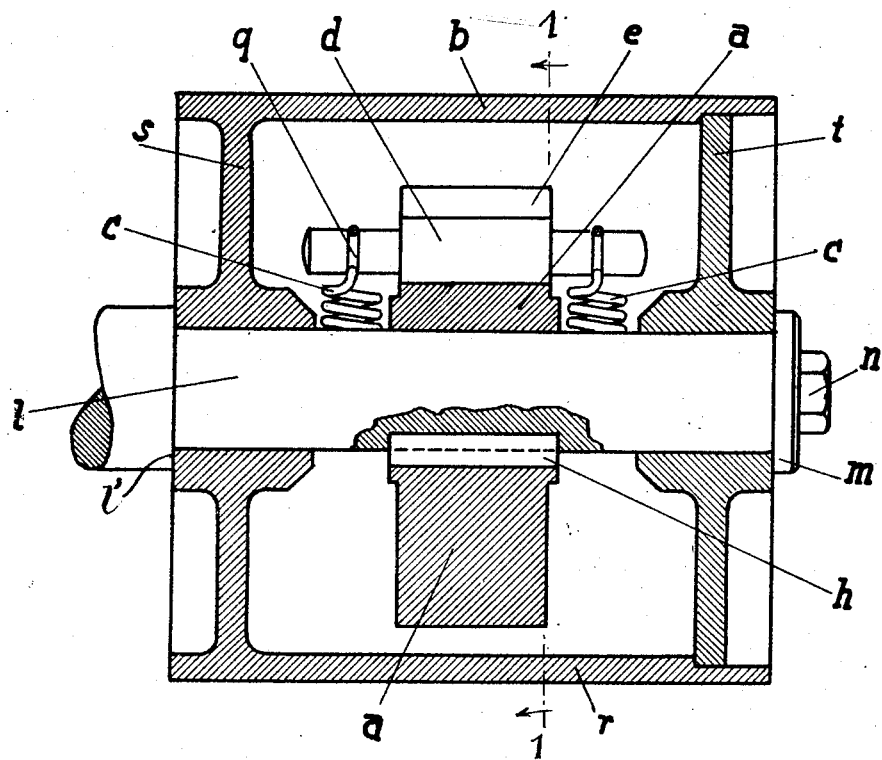

My invention will best be understood when described in connection with the accompanying drawings, in which Fig. 1 is a vertical cross-section through the clutch, on line 1—1 of Fig. 3, with parts left out for the sake of clarity; Fig. 2 is a similar view of a slightly modified form of the invention; and Fig. 3 is a vertical longitudinal section through Fig. 1 with portions in elevation.

Referring more in detail to the drawings, a pulley member $b$, presenting front and rear faces $s$ and $t$ respectively, rides loosely on the driving shaft $l$ and is retained thereon against axial displacement between the shoulder $l'$ and the end nut $n$ with washer $m$. In the pulley is housed the coupling mechanism. On the shaft $l$ is suitably fixed, for instance by means of the illustrated key and feather arrangement $h$, the clutch member or plate $a$ having, in the present instance three flat, tangential jaw faces opposing the inner periphery of the pulley $b$, which inner periphery constitutes a jaw face for cooperating with the several flat jaw faces. Each flat jaw face is interrupted by a T-slot or channel $f$ extending parallel to the shaft $l$ or transversely of the flat jaw face, the stem of the slot leading inwardly, radially of the disk-like clutch member $a$ into a chamber. Within each chamber is normally disposed a clutch roller $d$.

The three coupling rollers $d$ are provided with circumferential grooves $q$ near their reduced, trunnion-like extremities and they are resiliently held together by a system of coil springs $c$ endwise mounted in said grooves, forming a unit which relative to the slotted plate has a certain movability about the axis of the coupling and an inertia movement of rotation of its own about this axis. In the state of rest, Figs. 1 and 2, the several rollers $d$ are situated in one of the end positions in the cross-portions of the T-slots, and they are jointly held together and in this end position by the coil spring system whose relatively contracting forces coact on each roller in a resultant centripetally directed to the shaft axis. If now the driving member $a$, is rotated for instance in a counter-clockwise direction, then the mass unit, represented by the roller system, and the coil spring unit, will partake of this rotary movement as soon as the rollers $d$ have reached the rearmost end of the cross-slots (in the sense of the rotary direction). Upon the speed of the driving member increasing, the centrifugal force of the rollers $d$ will eventually overcome the centripetal force of the coil spring system and force the rollers outwardly, which tendency, however, is opposed by a barring or locking means, represented here by the jaws $e$. Even after the driving member has attained its full speed the coupling rollers $d$ will not move out of their relatively locked position in the T-slots. This can be brought about by suddenly momentarily retarding the rotary speed of the driving member, of which retardation the relatively rotatable mass unit of the rollers $d$, and the springs $c$, owing to its inertia does not partake but speeds on unchecked when the rollers will move forward in their cross-slots and advance in the course of this relative forward movement to in front of the slot stems or throats where they are no longer impeded by the barring action of the jaws $e$ and are now, by centrifugal force, thrown radially out through the slot throats $f$ against the inner circumference of the pulley $b$ to be driven. They then glide along the flat jaw faces and wedgingly couple the clutch member $a$ with the pulley $b$. Obviously, the roller, in the construction shown in Fig. 1 will gradually ride up the beveled faces of the chamber $f$ and out through the throats without any momentary retardation of the driving member.

It is immaterial for our purposes how the momentary speed retardation or acceleration for coupling purposes is brought about. If, for instance, an electromotor is used as driver, short mass impulses can readily be sent into the coupling; in fact, the ordinary manipulation of the starter is apt to bring the coupling into interdependence so that the purely mechanically operating clutch can be placed into positive interdependence with the switch steps of the electrically operating starter, which, obviously, is of great moment in starting electromotors under full load.

In the case of an explosion engine, controlling mass impulses or shocks can readily be called forth by manipulation of the ignition, and in steam engines momentary variation in the admission will be found effective for our purposes.

Upon slowing down or arrest of the coupling the centrifugal force disappears and the forces acting in radial inward direction on the rollers are given free play, and inasmuch as the wedge surfaces extend obliquely relative to these radially directed forces, there will be set up for each roller a component force directed toward the slot throat which forces the roller along the faces toward and then into the throat of the T-slot. The driving member is thereby uncoupled from the driven member and the parts are then in the inoperative position ready for a new coupling operation.

Though the construction and operation of my improvement has been described in connection with a pulley it is apparent that it may also be used with various other power transmitting machine parts, and it must be fully understood that the illustrated arrangement serves merely as an example of how my invention can be serviceably carried into practice and that it may be embodied in other ways without overstepping the boundaries of the underlying inventive thought.

What I claim is:—

1. Coupling device, comprising a rotatable driving member, a rotatable driven member, and coupling members, the latter being adapted to be automatically displaced so as to permanently couple or uncouple respectively the rotatable members from each other, said automatic displacements of the coupling members being responsive to momentary impulses affecting the speed of the rotation of one of the rotatable members.

2. An automatic coupling comprising a driving member, an encircling driven member, a disk-like clutch member on the driving member having radial slots opening through its periphery, a coupling roller in each slot projecting at its ends from the sides of the clutch member, and extensible spring means engaging about the projecting ends of the rollers and coupling the same together.

3. An automatic coupling comprising a driving shaft, an encircling driven member, a disk secured to the shaft and formed with radial slots opening through its periphery toward the driven member, the inner ends of the slots being enlarged and formed with flat bottoms, a clutch roller in each slot enlargement adapted to roll along the flat bottom thereof and up its wall out of the slot to engage between the disk and the encircling driven member, and coiled springs connecting the several rollers together as a yieldable unit.

4. In a shaft coupling of the character set forth, a rotatable driving member, a rotatable member to be driven thereby, coupling means interposed between said two members, means normally locking said coupling means in the inoperative position, and said locking means adapted to be momentarily operated by speed-affecting mass impulses for releasing said coupling means to move into the operative position.

5. In a shaft coupling of the character set forth, in combination with a rotatable driving member, a rotatable driven member, centrifugally influenceable wedge-coupling means interposed between said two members, means associated with said coupling means adapted to counteract this centrifugal tendency, and means normally locking said coupling means in the inoperative position, and said locking means adapted to be momentarily displaced relative to said coupling means by impulses affecting the rotary speed of said driving or driven members respectively, for releasing said coupling means to be then moved by centrifugal force into position for wedge-intercoupling said driving and said driven members.

6. In a shaft coupling of the character set forth, in combination with a power shaft, a member loosely rotatable on said shaft, a driving member fixed on said shaft, comprising a plate presenting peripherally a plurality of T-slots, flattened faces on the periphery of said plate flanking each of said T-slots, coupling means adapted to coact with said plate slots, means associated with said plate and adapted to normally retain said coupling means in the inoperative position within said T-slots but allowing them to be moved thereout onto said flattened plate faces into the wedge-coupling position upon the said slotted plate being momentarily relatively displaced by sudden mass impulses sent over said power shaft.

7. An automatic coupling comprising a driving member, an encircling driven member, a clutch member on the driving member having slots opening inwardly through its periphery into enlarged chambers, a coupling member in each chamber and movable outwardly through the respective slot to wedgingly couple the clutch member and the driven member, and means for moving the coupling members back into their respective chambers.

8. An automatic coupling comprising a driving member, an encircling driven member, a clutch member on the driving member having peripheral slots with inwardly undercut walls forming chambers, a coupling member arranged in each chamber for movement, centrifugally, outwardly onto the periphery of the clutch member for clutching the latter and the driven member, and spring means connecting the coupling members together.

In testimony whereof I affix my signature.

KARL OBERMOSER.